UNITED STATES PATENT OFFICE.

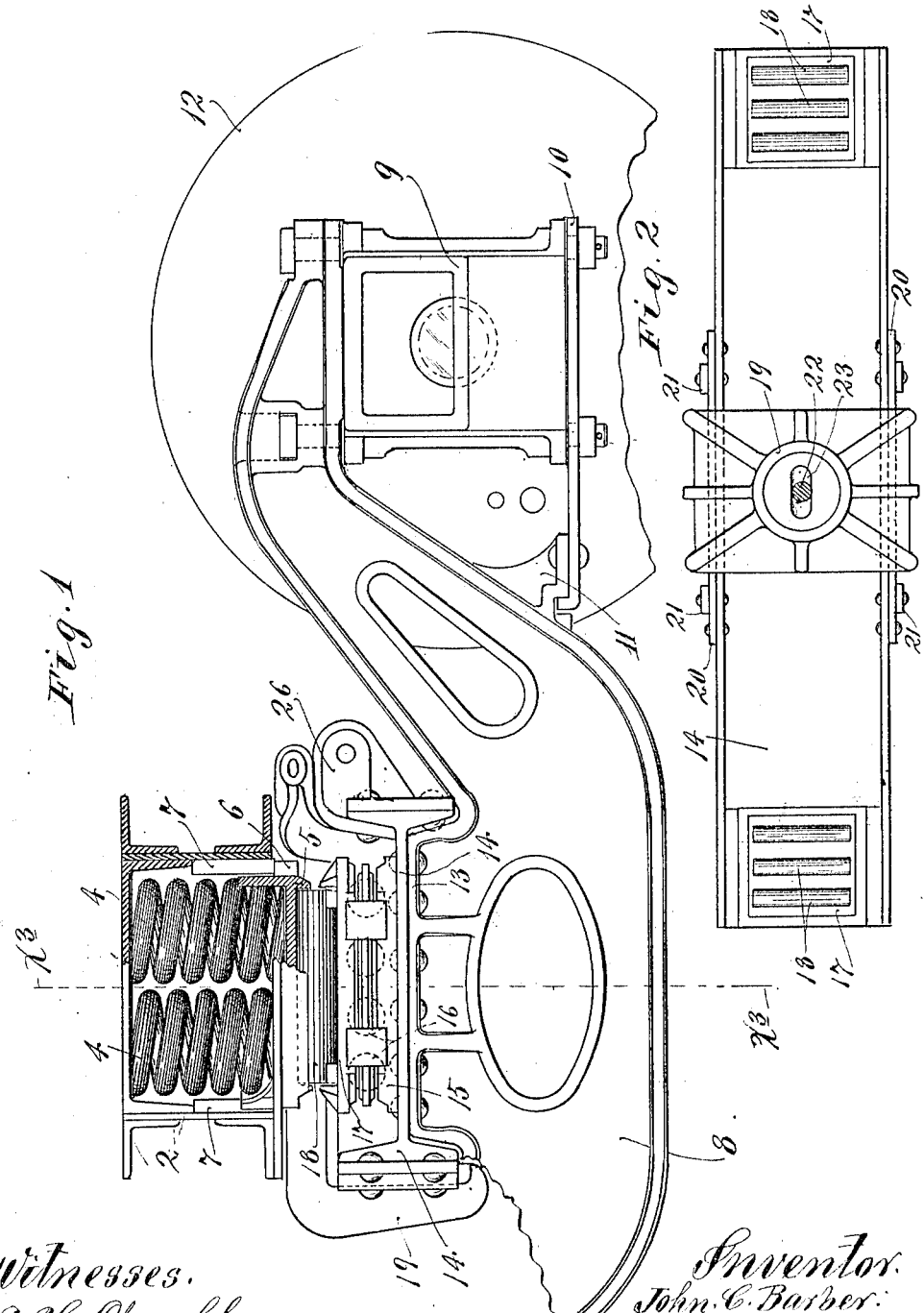

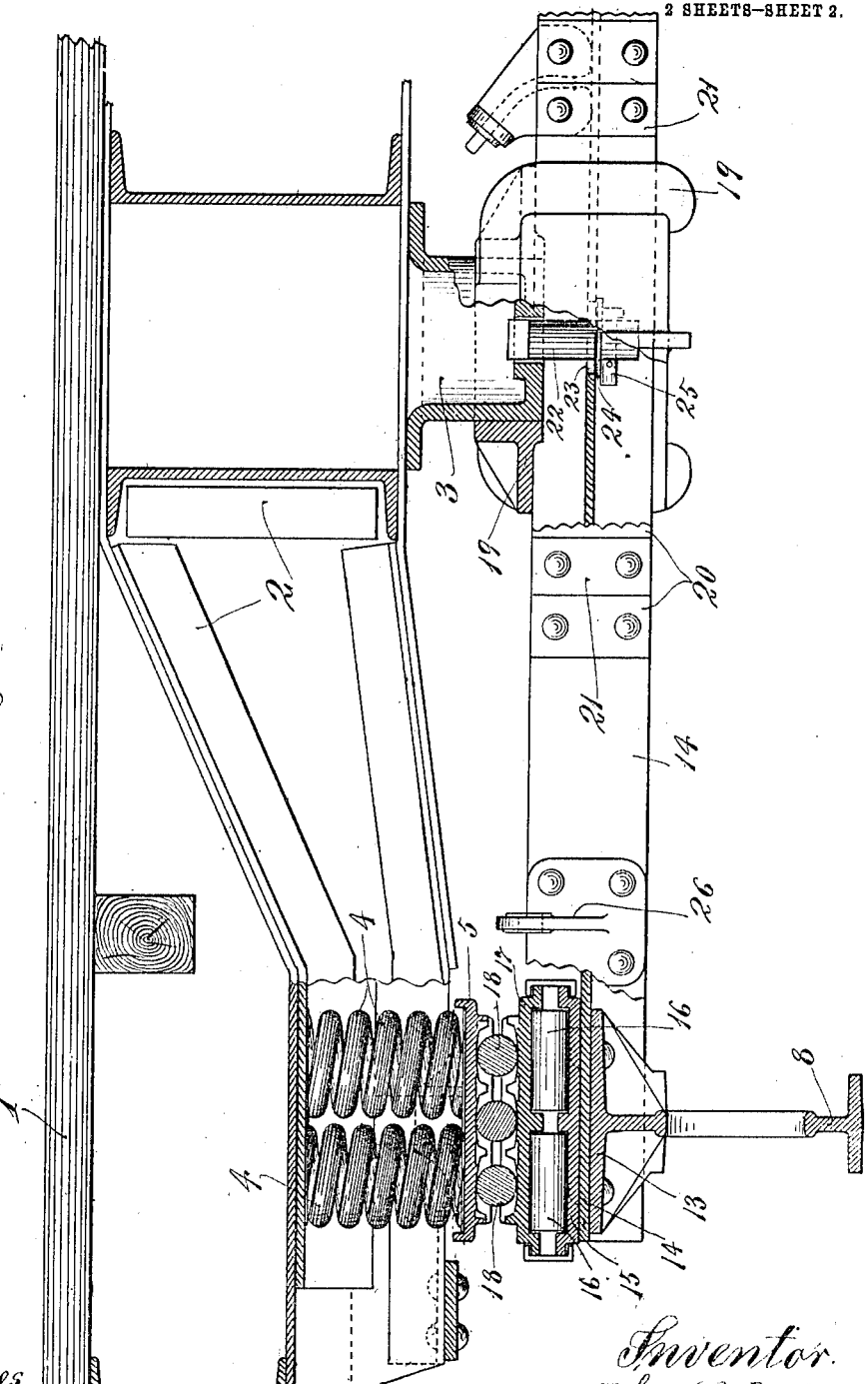

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

1,073,654.   Specification of Letters Patent.   Patented Sept. 23, 1913.

Application filed April 12, 1913. Serial No. 760,611.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

This invention has for its object to provide an improved car truck especially adapted for railway service, and to such ends, generally stated, it consists of the novel devices and combinations of devices hereinafter described and defined in the claims.

Particularly, this invention is designed as an improvement on the construction disclosed and claimed in my prior Patent No. 977,429, of date, December 6, 1910, entitled "Car truck". In the said prior patent, the side frames of the truck were tied together by a heavy transom which also performed the function of a truck bolster, and the body bolster of a car was pivotally connected to the said transom with freedom for vertical movements and for endwise movements transversely of the truck. My present invention involves the above stated features of construction. In both instances, the body bolster was supported on combined radial and lateral motion devices. Such construction is broadly claimed in my said prior patent, but as a feature of improvement over the form of the device specifically illustrated in the drawings of the said prior patent, I interpose these combined radial and lateral motion devices vertically between the body bolster and the truck side frames. As will be noted by reference to the drawings of the said prior patent, the combined radial and lateral motion roller bearing devices are there located inward of the truck side frames and are interposed directly between the transom and body bolster.

In the accompanying drawings which indicate the present invention, like characters indicate like parts throughout the several views.

Referring to the drawings, Figure 1 is a view in side elevation with some parts sectioned and some parts broken away, showing a car truck embodying my invention; Fig. 2 is a plan view showing the transom or cross tie of the truck frame and certain devices applied thereto; and Fig. 3 is a transverse vertical section taken approximately on the line $x^3$ $x^3$ on Fig. 1, some parts being broken away, and some parts being shown in full.

A portion of the car body is indicated by the numeral 1 and one of its body bolsters (which, as shown, is built up of plates and angles and is of a trussed form), is indicated as an entirety by the numeral 2. At its central portion, this body bolster is provided with a rigidly secured depending hub 3, and at its ends, it has box-like recesses that receive the truck springs 4. Preferably, the truck springs 4 are arranged in groups of four and at their lower ends are seated on combined roller caps and spring seats 5. These members 5 are provided with vertical grooved side extensions 6 that engage and slide upon vertical guide ribs or bars 7, rigidly secured to the inner surface of the sides of the ends of said body bolster 2. The above noted combined roller caps and spring seats 5 constitute elements of lateral motion roller bearing devices hereinafter to be described.

The truck side frames 8 are preferably of the cast steel drop girder type. Their upper ends rest on journal boxes 9 diagrammatically indicated in Fig. 1, and are bolted to the said journal boxes and the tie straps 10 secured to lugs 11 on the side frames 8. The truck wheels 12 are diagrammatically indicated in Fig. 1. The dropped intermediate portions of the side frames 8 are provided with raised and laterally extended webs 13, to which the ends of a heavy transom or cross tie 14 of I-beam form are rigidly secured by rivets applied both on the inner sides and the outer sides of the vertical webs of the said side frames. This transom 14 performs the functions of a cross tie and of a truck bolster.

Rigidly secured, or otherwise seated in the ends of a horizontal web of the I-beam transom 14, directly over the horizontally extended web 13 of the truck side frames 8, are roller bases 15. Seated on the roller bases 15 are bearing rollers 16, and seated on the said rollers 16 are intermediate roller bearing plates 17. Bearing rollers 18 are interposed between the bearing plates 17 and the overlying combined roller caps and spring seats 5. The rollers 16 have their axes extended longitudinally of the transom 14, while the rollers 18 extend approximately at right angles to the said rollers 16. The said elements 15, 16 and 17 afford the radial motion devices of the truck, and the said elements 17, 18 and 5 constitute elements of the lateral motion devices of the truck. The said elements 15, 16, 17, 18 and 5 constitute combined radial and lateral motion roller bearing devices that are vertically interposed between the body bolster of a car and the truck side frames, in such manner that the weight of the load is transmitted from the car body to the truck on vertical lines which intersect the webs of the truck side frames, and hence, produce direct downward strains thereon, without subjecting the same to torsional strains and without subjecting the transoms or cross ties of the truck to bending strains. Otherwise stated, the load is not transmitted from the car body to the intermediate portion of a truck bolster or transom, and from thence, to the side frames, but is directly transmitted to the truck side frames. Of course, in the construction illustrated, the ends of the transom 14 are subjected to compression, but the said transom does not carry the load in any ordinary sense of the word and is not subjected to a bending strain by the load. The said transom, however, performs important functions and must be strong, so that it will rigidly tie together the two side frames of the truck. Inasmuch as in all railway cars, the trucks are pulled or pushed by a draft attachment secured on the car body, the truck must be propelled at the pivotal center, and hence, I provide a sliding pivotal connection between the body bolster 2 and the transom 14. This sliding pivotal connection may take different forms, but preferably, the hub 3 of the said body bolster is seated for pivotal and for vertical movements in a pivot casting 19, of box-like form, which is arranged for limited sliding movements on the central portion of the transom 14. This pivotal casting 19 preferably engages with wearing plates 20 on the front and rear sides of the transom 14, and its extreme traveling movement is limited by stops 21 rigidly secured on the said wearing plates. To limit the upward movements of the body bolster 2 and to prevent the elements of the combined radial and lateral motion roller bearing devices from jumping from position, I provide the hub 3 of the body bolster 2 with a depending pivot bolt 22 that works through a short longitudinal slot 23 in the web of the transom 14, and is provided just below said web with a stop washer 24 and with a co-operating stop pin 25.

The numeral 26 indicates brake hanger brackets secured on the transom 14 inward of the truck side frames.

With the construction above described, it is evident that the center bearing casting or bracket 19 travels on the transom 14 to permit the required lateral movements of the car body in respect to the car truck, or vice versa, and that the said hub 3 moves pivotally on the said casting to permit of the radial or pivotal movement of the truck frames. It will, of course, be understood and is obvious from the drawings, that the roller bearing plates or members 15, 17 and 5 are provided with roller engaging seats that are concave in cross section, that is, incline or deviate reversely in respect to a horizontal, so that they tend to maintain the car truck in a transverse intermediate position and parallel to the car body. When the springs 4 yield under weight of the load, the hub 3 moves vertically in the surrounding bearing of the center bearing casting or bracket 19.

What I claim is:

1. The combination with truck side frames and a transom rigidly connecting the same, of a body bolster, truck springs seated in the ends of said body bolster vertically over said side frames, and combined radial and lateral motion roller bearing devices vertically interposed between said springs and said side frames.

2. The combination with truck side frames of the drop girder type, and transoms rigidly secured to and seated directly on top of the intermediate portions of said side frames, of a body bolster intermediately pivoted to said transom for limited sliding movements longitudinally thereof, truck springs seated in said body bolster directly over said side frames, and combined radial and lateral motion bearing devices seated on the ends of said transoms and vertically interposed between said springs and side frames.

3. The combination with truck side frames of the cast drop girder type, the same having at their intermediate portions raised and laterally expanded bearing webs, of an angle iron transom seated on and rigidly secured to the raised webs of said side frames, a body bolster intermediately pivoted to said transoms for limited sliding movements longitudinally thereof, truck springs seated in the ends of said body bolster directly over the expanded webs of said side frames, and combined radial and lateral motion roller bearing devices seated on the ends of said transoms and vertically interposed between said springs and the expanded webs of said side frames.

4. The combination with truck side frames, and a transom rigidly connecting the same, of a pivot bracket mounted for limited sliding movements on the central portion of said transom, a body bolster having a hub pivoted in said sliding pivot bracket and capable of vertical movements therein, and combined radial and lateral motion bearing devices and truck springs vertically interposed between the ends of said body bolster and the intermediate portions of said truck side frames.

5. The combination with truck side frames, and a transom rigidly connecting the same, of a pivot bracket mounted for limited sliding movements on the central portion of said transoms, a body bolster having a hub pivoted in said sliding pivot bracket and capable of vertical movements therein, combined radial and lateral motion bearing devices and truck springs vertically interposed between the ends of said body bolster and the intermediate portions of said truck side frames, and a connection preventing accidental separation of the said pivot hub from the said pivot bracket.

6. The combination with truck side frames, of an angle iron transom rigidly connecting the same, said transom having a longitudinal slot at the central portion of its web, of a pivot bracket mounted for limited sliding movements on the central portion of said transom, a body bolster having a pivot hub seated in said sliding pivot bracket for pivotal and vertical movements, a coupling bolt applied to said hub and depending through the central slot of said transom, a stop device applied to the end of said coupling bolt below the web of said transom, and combined radial and lateral motion bearing devices and springs interposed between said body bolster and side frames.

In testimony whereof I affix my signature in presence of two witnesses.

JOHN C. BARBER.

Witnesses:
 H. M. EDGERTON,
 F. L. BARBER.